(12) United States Patent
Wymore

(10) Patent No.: US 10,279,764 B1
(45) Date of Patent: May 7, 2019

(54) SKID PLATE ASSEMBLY

(71) Applicant: Iddea California, LLC, Brea, CA (US)

(72) Inventor: Timothy J. Wymore, Brea, CA (US)

(73) Assignee: Iddea California, LLC, Brea, CA (US)

( * ) Notice: Subject to any disclaimer, the term of this patent is extended or adjusted under 35 U.S.C. 154(b) by 21 days.

(21) Appl. No.: 15/795,539

(22) Filed: Oct. 27, 2017

(51) Int. Cl.
*B60R 3/00* (2006.01)
*B60R 19/16* (2006.01)
*B60R 19/50* (2006.01)

(52) U.S. Cl.
CPC ............... *B60R 19/16* (2013.01); *B60R 3/00* (2013.01); *B60R 19/50* (2013.01); *B60R 2019/505* (2013.01)

(58) Field of Classification Search
CPC ..... B60R 19/16; B60R 2019/525; B60R 3/00; B60R 19/50; B60R 2019/505
USPC ........................................................ 296/117
See application file for complete search history.

(56) References Cited

U.S. PATENT DOCUMENTS

| | | | | |
|---|---|---|---|---|
| 5,139,295 | A * | 8/1992 | Escobedo ................. | B60R 3/00 182/90 |
| 6,612,595 | B1 * | 9/2003 | Storer ....................... | B60R 3/00 280/163 |
| 6,925,735 | B2 * | 8/2005 | Hamm ................... | B62D 49/04 172/811 |
| 7,699,577 | B2 * | 4/2010 | Lougheed ............ | A01B 59/062 37/468 |
| D636,305 | S * | 4/2011 | Alvarez ....................... | D12/171 |
| 8,585,107 | B2 * | 11/2013 | Kekich, Jr. ............. | B60R 19/52 293/115 |
| D737,724 | S * | 9/2015 | Schroeder ..................... | D12/14 |
| D811,967 | S * | 3/2018 | Brown ........................ | D12/171 |

OTHER PUBLICATIONS

Google Search, aftermarket truck skid plates, web page <https://www.google.com/search?q=aftermarket+truck+skid+plates&source=lnms&tbm=shop&sa=X&ved=0ahUKEwiGuunUy7_YAhVJ3mMKHd9eCYAQ_AUICigB&biw=1329&bih=737>, Jan. 4, 2018, 32 pages.

* cited by examiner

*Primary Examiner* — Pinel E Romain
(74) *Attorney, Agent, or Firm* — Stetina Brunda Garred and Brucker

(57) ABSTRACT

A skid plate assembly is provided for mounting to a vehicle front-end, proximate a vehicle bumper. The assembly includes a support frame that defines a bottom portion configured to extend forward from the vehicle and a front portion connected to the bottom portion and configured to extend upwardly from the bottom portion and a cross at least a portion of the vehicle front end. A skid plate defines a bottom portion extending along the support frame bottom portion, and a front portion extending upwardly to the support frame front portion. The skid plate extends about at least a portion of the support frame front portion to define a skid plate upper surface. A skid plate cover is detachably engaged to the skid plate and extends along the skid plate bottom portion and the skid plate front portion. Mounting brackets are provided to engage the skid plate to the vehicle.

14 Claims, 6 Drawing Sheets

SKID PLATE ASSEMBLY

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention lists accessories used to enhance the off-road capabilities and durability of a vehicle. More particularly, the present invention is directed to an aftermarket assembly for mounting on a vehicle front end for protecting the front end and underside of a vehicle engaged in off-roading activity. Off-roading is the activity of driving or riding a vehicle on unsurfaced roads or tracks, made of materials such as sand, gravel, riverbeds, mud, snow, rocks, and other natural terrain. Types of off-roading range in intensity, from leisure drives with unmodified vehicles to competitions with customized vehicles and professional drivers. Off-road terrains require vehicles capable of accommodating off-road conditions, which typically require extended ground clearance, off-road tires and drive-train. Some manufacturers offer vehicles specifically meant for off-road use.

One danger associated with off-roading is damage to the vehicle from hitting rocks or other hard surfaces on very uneven terrain. A typical solution would be to install skid plates (sometimes also called bash plates). A skid plate is an abrasion-resistant material affixed to the underside of a vehicle or boat to prevent damage to the underside when contact is made with the ground. Thick metal plates are attached to the underside for protecting vulnerable parts (such as the transfer/gear box or engine oil sump). Some manufacturers install skid plates as standard equipment on some of their vehicles. For many others this additional protection is available as an after-market accessory. Fake skid plates are also added to vehicles for an off-road look.

Skid plates may be simple flat plates, but they may also be formed (by stamping or by welding multiple pieces) to protect shaped items like differentials. In addition to skid plates, many off-roaders install grille or bull guards, which can be added with or without an improved bumper. These typically metal frameworks extend to protect the grille, and potentially the headlights as well. Grill protection systems serve to sweep vegetation away from the vehicle centerline, and may also function to deflect the vehicle from less movable obstacles. Grille protection systems can be assembled piecemeal, or provided as an integrated assembly, e.g. a one-piece winch-mount bumper with a prerunner bar and grille guard can be fitted to a vehicle.

The present invention is directed to an automotive accessory that may be installed on a vehicle as a single-piece unit, which includes a skid plate for protecting the underside of the vehicle and a grille support frame that provides protection for the front end of a vehicle.

The present invention is further directed to providing a skid plate assembly that includes a replaceable skid plate cover, that provides an aesthetically pleasing appearance, while also serving as a sacrificial cover for protecting the skid plate.

The present invention further is directed to providing a skid plate cover that is manually engageable/disengageable to the skid plate without the need for disassembling the skid plate assembly, or removing the skid plate assembly from the vehicle.

BRIEF SUMMARY

A skid plate assembly is provided for mounting to a vehicle front-end, proximate a vehicle bumper. The assembly includes a support frame extending about and providing impact protection for at least a portion of the vehicle front end. The support frame defines a bottom portion configured to extend forward from the vehicle and a front portion connected to the bottom portion and configured to extend upwardly from the bottom portion and a cross at least a portion of the vehicle front end. A skid plate is provided which defines a bottom portion extending along the support frame bottom portion, and a skid plate front portion extending upwardly to the support frame front portion. The skid plate extends about at least a portion of the support frame front portion to define a skid plate upper surface. A skid plate cover is detachably engaged to the skid plate and extends along the skid plate bottom portion and the skid plate front portion. Mounting brackets are provided to engage the skid plate assembly to the vehicle so as to orient the support frame and the skid plate below and forward of the vehicle bumper.

The skid plate cover is preferably engaged to the skid plate bottom surface and the skid plate front surface by a plurality of manually engageable fasteners, which are arranged forward of the vehicle bumper to facilitate installation/removal of the skid plate without the need to disengage the skid plate assembly from the vehicle, or to disengage the skid plate from the tubular support frame.

A step plate may be engaged to the skid plate upper surface for facilitating access to the engine bay. Preferably the step plate defines an array of upwardly extending protrusions having apertures formed therein for defining a sure footed step surface that allows drainage of water or other fluids falling on the step plate surface.

Preferably the step plate is vertically spaced above the supporting skid plate upper surface, e.g., by a plurality of spacing members disposed intermediate the skid plate upper surface and the step plate, to mitigate the potential for fluid collection areas intermediate the skid plate and the step plate.

The skid plate front portion may define an aperture extending through the skid plate, and adjacent receiving brackets formed on the skid plate rear surface, for mounting a fixture to the skid plate proximate the aperture and extending rearwardly therefrom. A light fixture, sensor assembly, or other device may be disposed within the aperture.

The skid plate may be formed of Kevlar® or other polymer material.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The following descriptions of the illustrated embodiments of the invention are directed towards a skid plate assembly for mounting to a vehicle and proximate the vehicle bumper. The embodiments are intended to be merely exemplary in nature, and are no way intended to limit the invention or its applications or uses.

Figure 1:
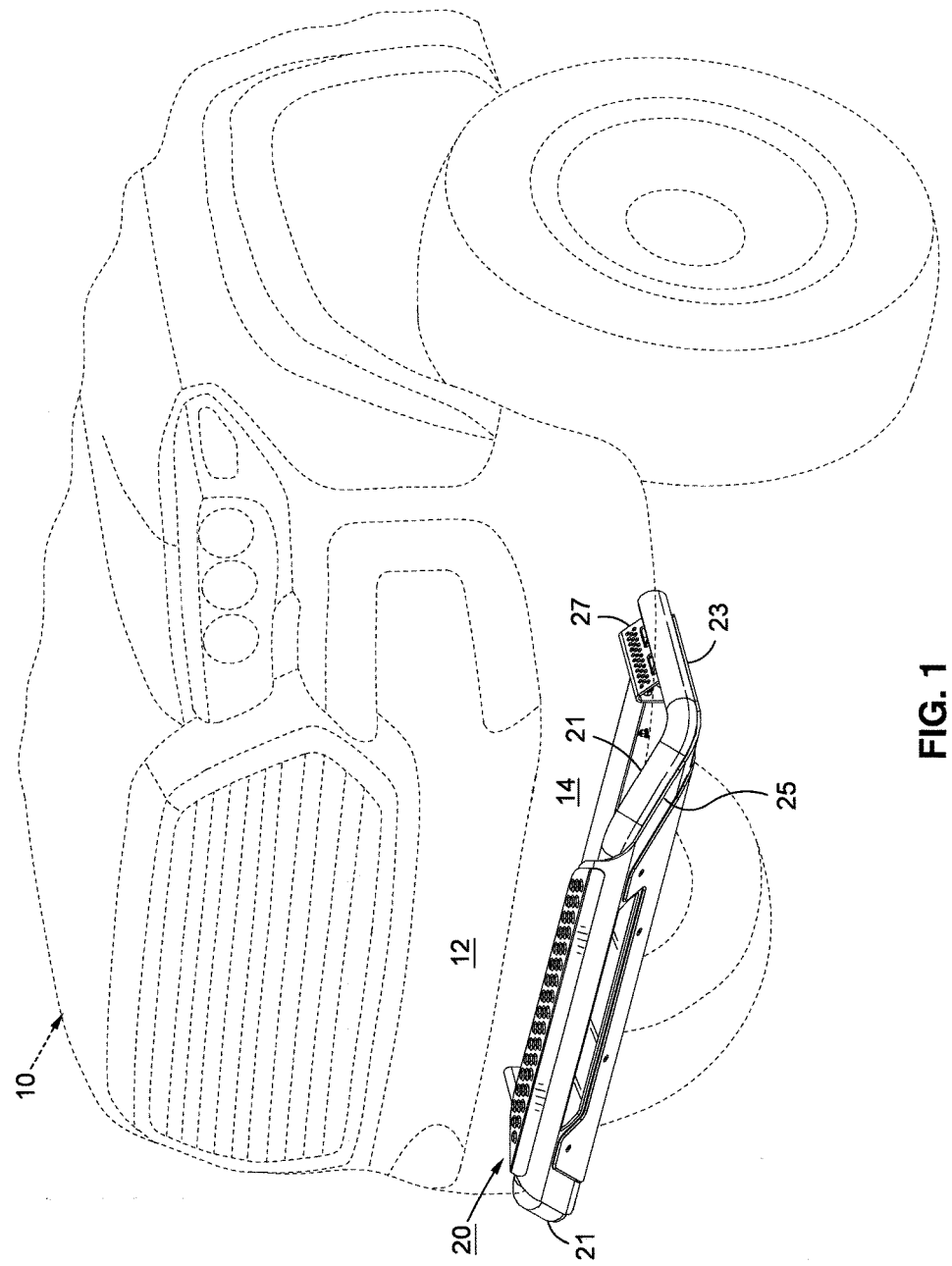
FIG. 1 is a front perspective view of one embodiment of a skid plate assembly in accordance with the present invention, mounted on the front end of the vehicle.
Figure 2:
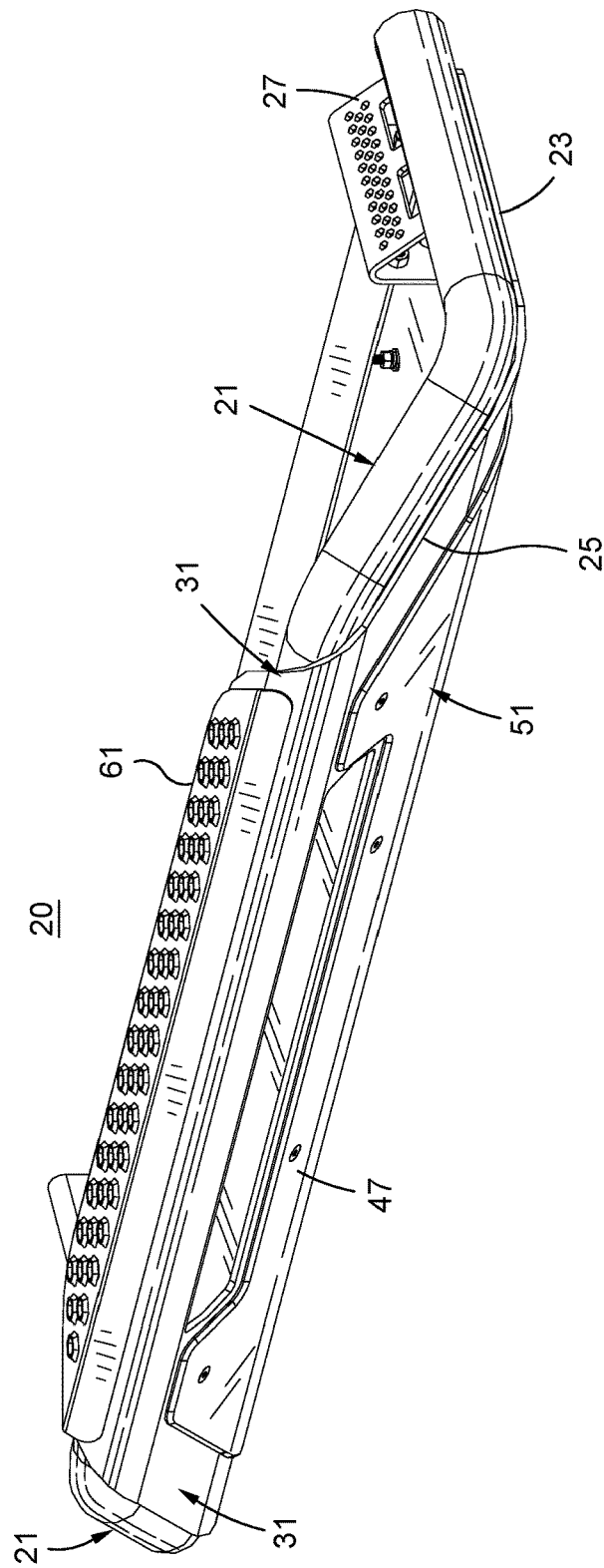
FIG. 2 is a front perspective view of the skid plate assembly, detached from the vehicle.

Referring to the drawings, FIG. 1 illustrates a front perspective view of a skid plate assembly, in accordance with one embodiment of the invention, as mounted on a vehicle. As shown therein, skid plate assembly 20 is shown mounted on vehicle 10 proximate the vehicle front end 12. The skid plate assembly 20 is configured and mounted so as to extend about at least a portion of the front end 12, forward of bumper 14.

Referring again to FIG. 1, and is shown in more detail at FIGS. 2-6, the skid plate assembly 20 includes a tubular support frame 21 extending about at least a portion of the vehicle front end 12. The support frame 21 defines a bottom portion 23 configured to extend forward along both sides of the vehicle, and a support frame front portion 25 extending upwardly from the bottom portion, and across at least a portion of the vehicle front end.

Figure 3:
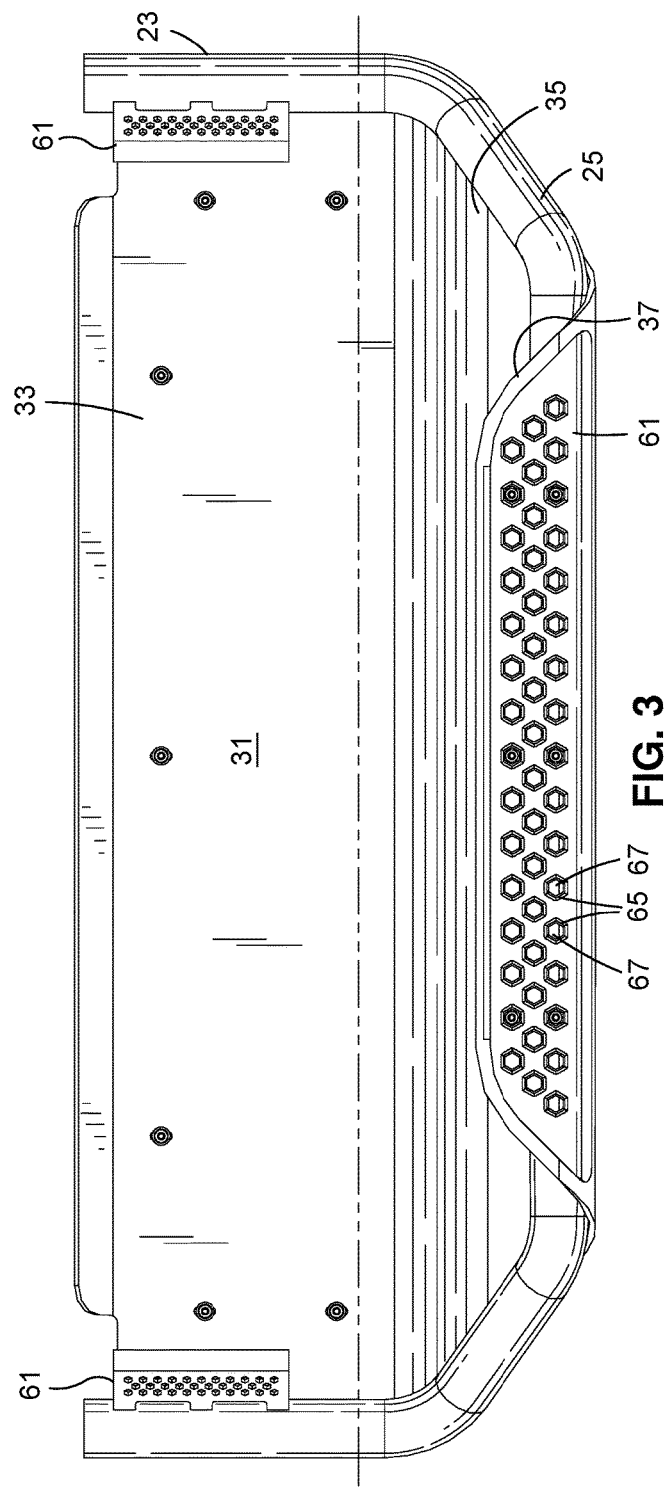
FIG. 3 is a top view of the skid plate assembly.
Figure 4:
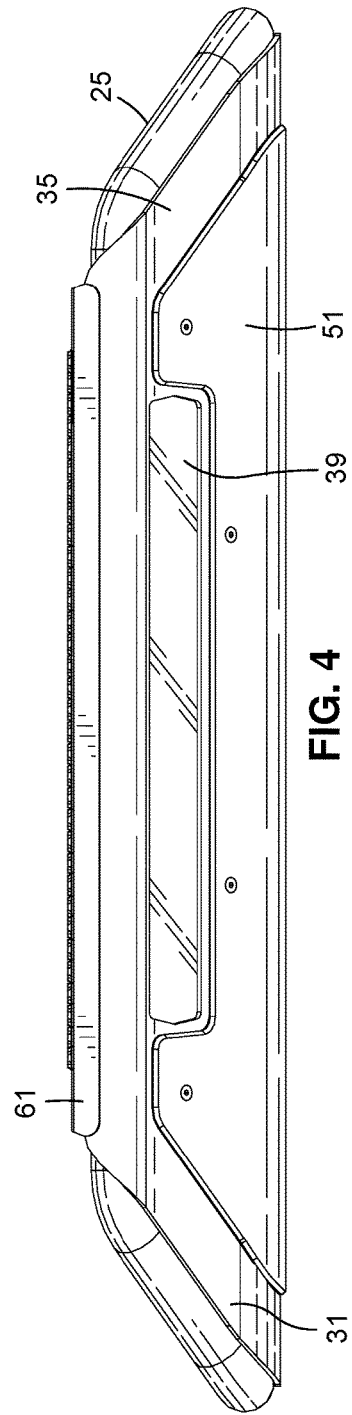
FIG. 4 is a bottom perspective view of the skid plate assembly.
Figure 5:
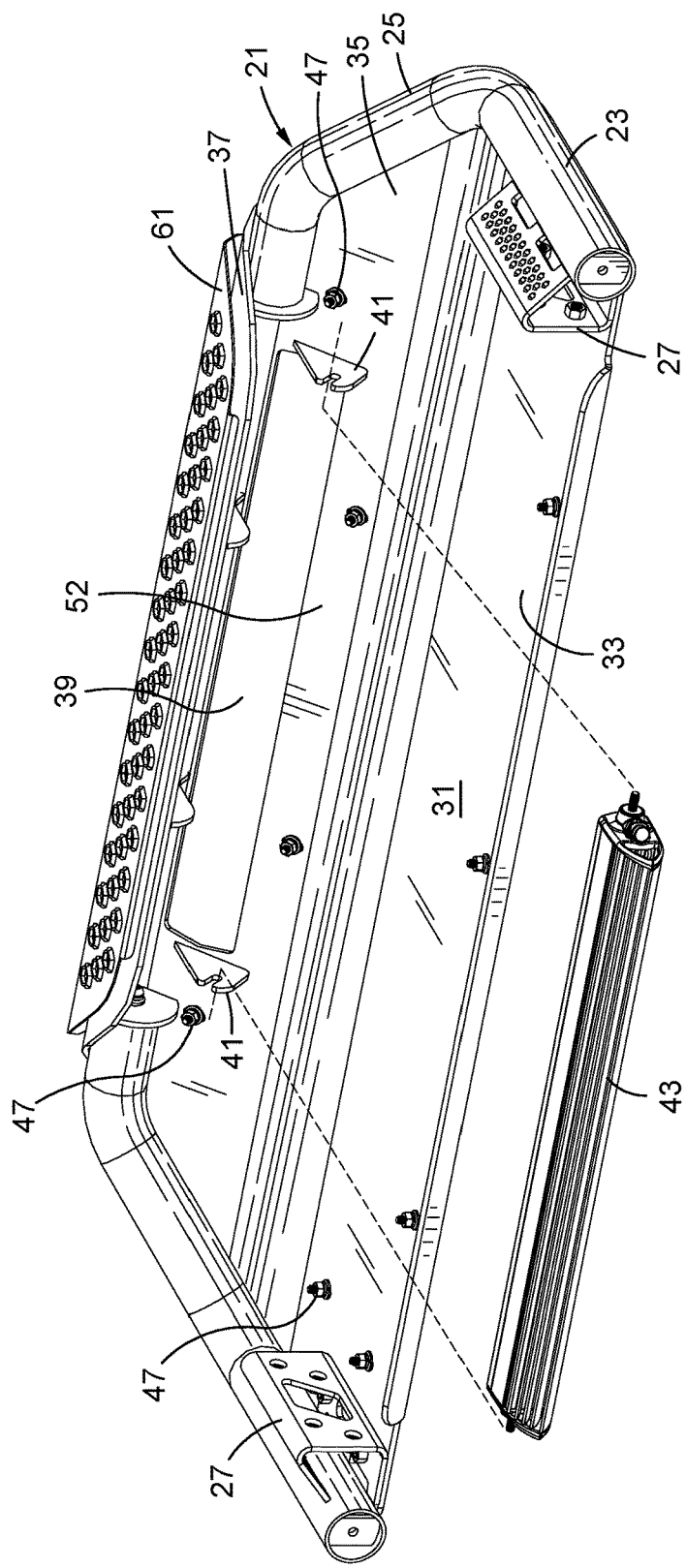
FIG. 5 is a rear perspective view of the skid plate assembly.
Figure 6:
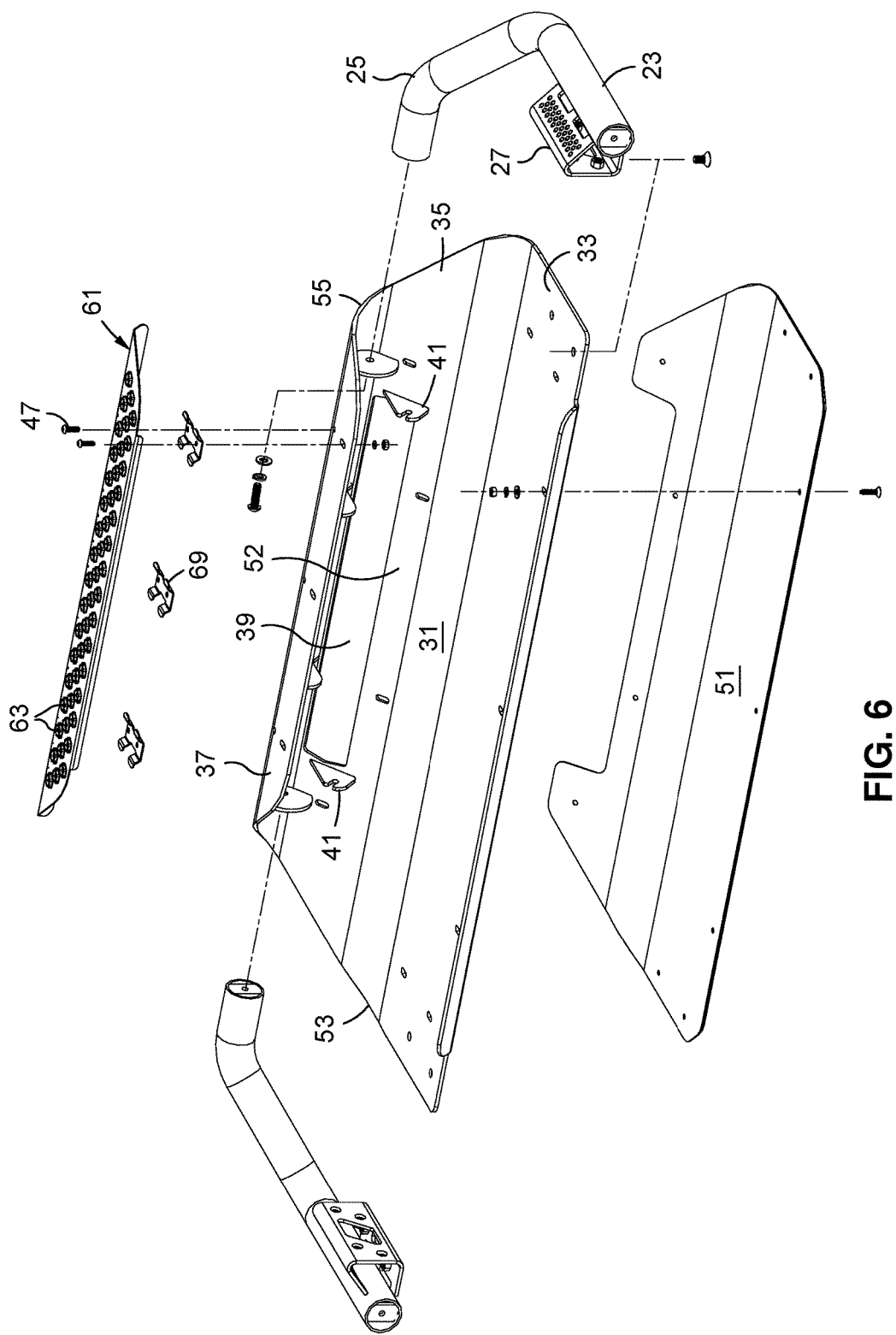
FIG. 6 is an exploded view of the skid plate assembly.

As shown more clearly at FIGS. 3, 5, and 6 the skid plate 31 defines is a skid plate bottom portion 33, in engagement with and extending along the support frame bottom portion 23, and the support frame front portion 25. In one embodiment the support frame 21 is secured to the skid plate 31 by weld joints extending along the support frame bottom portion 23 and a portion of the support frame front portion 25. The support frame 21 may also be welded to the support brackets 27, which in turn may be fastened to the skid plate 31. Mounting brackets 27 are secured to the skid plate 31 and are engageable to the frame of vehicle 10.

Figure 7:
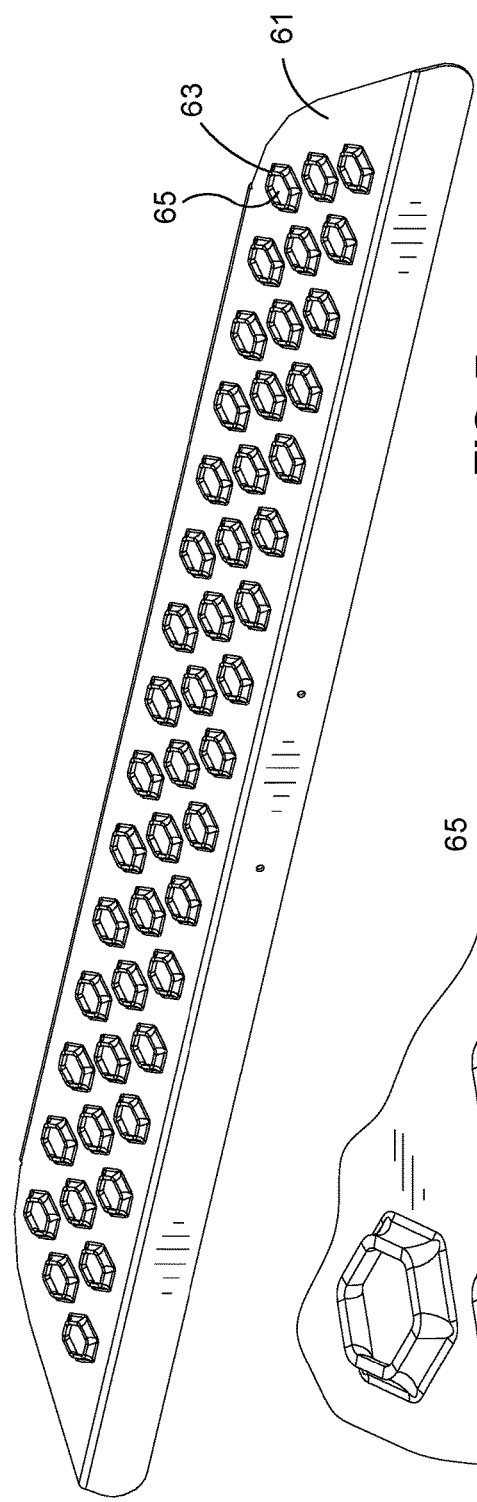
FIG. 7 is a front perspective view of the step plate.
Figure 8:
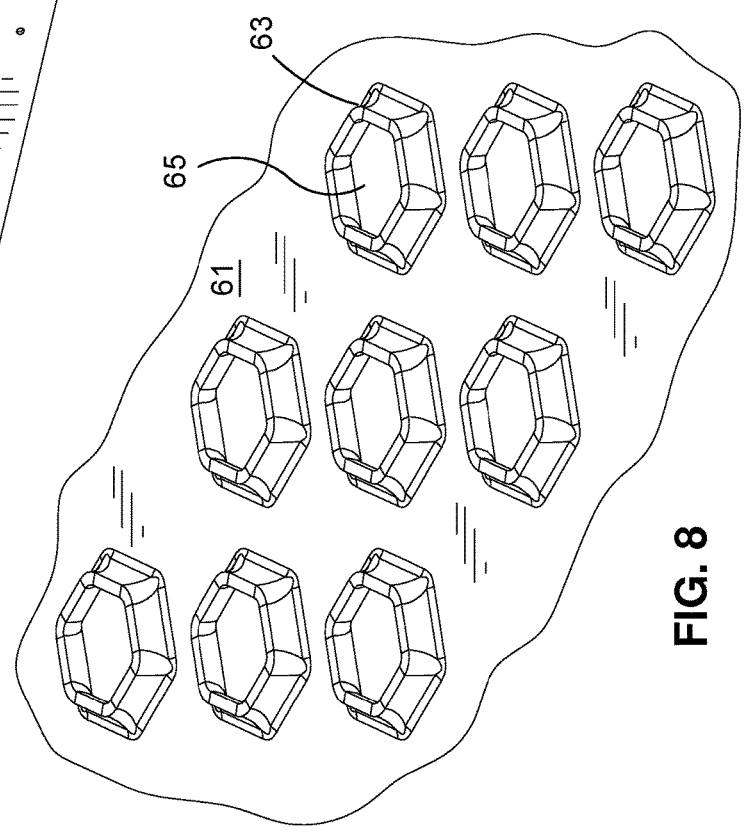
FIG. 8 is an enlarged sectional view of a step plate section.

The skid plate front portion 35 extends about the portion of the support frame front portion 25 to define a skid plate upper surface 37. Step plate 61 is engaged to the step plate upper surface 37 (as shown at FIGS. 6 and 7). The step plate 61 preferably defines an array of vertically extending protrusions 65 having apertures 67 formed therein. The step plate 61 is preferably spaced from the skid plate upper surface 37 by a plurality of spacing members 69 disposed intermediate the skid plate upper surface 37 and the step plate 61. The construction of step plate 61 provides a sure footed surface that drains water or other fluids from the surface contact areas, to enable the driver, mechanic or other person to securely stand on the skid plate 61 to conveniently access the engine bay of the vehicle 10.

As shown at FIG. 5, the skid plate front portion 35 may define an interior surface 52 and aperture 39 extending through the skid plate front portion 35. Fixture receiving brackets 41 are engaged to the interior surface 52, about the aperture 39. The fixture receiving brackets 41 are configured to receive and engage a fixture 43, which may be implemented as a light module, a sensor assembly or autonomous vehicle data stream interface module. When engaged to the receiving brackets 41 the fixture 43 orients the fixture 43 adjacent to and behind the aperture 39, to provide additional utility to vehicle 10 while protecting the fixture 43 when vehicle 10 travels through rough or irregular terrain.

When fixture 43 is implemented as a light module, the light module is expected to be connected to the vehicle electrical system in order to provide power to the light module. When a sensor module is utilized, the sensor module is expected to also be in electrical communication with the vehicle electronic control unit (ECU), to communicate sensor information to the ECU for processing sensed information regarding the environment proximate the vehicle 10. When the fixture is an autonomous vehicle data stream interface module, the fixture is also in communication with the vehicle ECU to communicate a received autonomous vehicle (V2X) data stream and a vehicle ECU, and other on-board or off-board devices, as may be useful to interface the vehicle to the V2X data stream, or to enable a legacy (not originally adapted to interface a V2X data stream) vehicle to interface with a V2X data stream.

A skid plate cover 51 is provided and detachably engaged to the skid plate 31 by means of manually detachable fasteners 47, shown as nut and bolt couplings. The skid plate cover 51 is configured to extend along and conform to the contour of the bottom surface 53 and front surface 55 of the skid plate 31. The skid plate cover 51 may further extend about skid plate aperture 39, formed in the skid plate front portion of 35. As such, the skid plate cover 51 is expected to incur the greatest wear and tear when the vehicle 10 travels through rough terrain. In order to preserve the life and appearance of the support frame 21 and the skid plate 61, the skid plate cover 51 is preferably formed of Kevlar® polymer or a material that may be inexpensively produced, to allow the skid plate cover 51 to be designed to accommodate different contours of the skid plate and to serve as a sacrificial structure for preserving the skid plate assembly 20.

The skid plate cover 51 is preferably mounted to the skid plate 31 by manually engageable/disengageable fasteners 47, to facilitate the replacement of a sacrificial skid plate cover 51 once it has been marred or damaged from use. As the support frame 21 extends the front portion 35 of the skid plate assembly 20 forward of the vehicle bumper, the fasteners 47 engaging the skid plate 61 to the skid plate cover 51 are readily accessible from the front of vehicle 10. Consequently, the skid plate cover 51 can be installed on or removed from the skid plate 61 without the need to disengage the skid plate 61 from the support frame 21, or the need to disengage the skid plate assembly 20 from vehicle 10. In such a manner, this the skid plate assembly 20 of the present invention provides a durable structure for protecting the front end and underside of the vehicle, where the most wear prone portion of the skid plate assembly 20, i.e., the skid plate cover 51, can be easily installed or replaced, without great effort or substantial expense.

As will be apparent to those with ordinary skill in the art, skid plate cover 51 may be configured to incorporate a variety of different shapes as may be aesthetically desired, while following the general contour of the skid plate 31. Similarly, the skid plate cover 51 may incorporate different surface finishes and textures as desired.

Accordingly, the combination of the forwardly extending support frame 21 and the replaceable skid frame cover 31 allows the skid plate assembly 20 to function as both a skid plate for protecting the lower surface of the vehicle, and a front end guard for protecting the front end of the vehicle adjacent the bumper 14. The integrated assembly of the skid plate assembly 20 facilitates installation or removal from the vehicle and the detachable nature of skid plate cover 51 preserves both the appearance of the skid plate assembly and mitigates wear on the skid plate 31.

Other advantages and functions of the skid plate assembly 20 will be apparent to one of ordinary skill in the art. As such, the above illustrations and descriptions have been given by way of example, and not limitation. Further, the various features and embodiments of the invention can be used alone, or in varying combinations with each other and are not intended to be limited to the specific combinations described herein. Thus, the scope of the claims is not intended to be limited by the illustrated embodiments.

What is claimed is:

1. A skid plate assembly for mounting to a vehicle front end proximate a vehicle bumper, the assembly comprising:
   a. a support frame extending about at least a portion of the vehicle front end, the support frame defining a support frame bottom portion configured to extend forward from the vehicle and a support frame front portion connected to the bottom portion and configured to extend upwardly from the bottom portion and across at least a portion of the vehicle front end;
   b. a skid plate defining a skid plate bottom portion in engagement with and extending along the support frame bottom portion and a skid plate front portion extending intermediate the skid plate bottom portion and the support frame front portion, the skid plate further extending about at least a portion of the support frame front portion to define a skid plate upper surface;
   c. a skid plate cover, detachably engaged to the skid plate and extending along at least a portion of the skid plate bottom portion and the skid plate front portion; and
   d. mounting brackets engaged to the skid plate, the mounting brackets being configured for engagement to the vehicle so as to orient the support frame and the skid plate below and forward of the vehicle bumper.

2. The skid plate assembly as recited in claim 1 further comprising a step plate engaged to the skid plate upper surface.

3. The skid plate assembly as recited in claim 2 wherein the step plate defines an array of upwardly extending protrusions having apertures formed therein.

4. The skid plate assembly as recited in claim 3 further comprising a plurality of spacing members disposed intermediate the skid plate upper surface and the step plate.

5. The skid plate assembly as recited in claim 1 wherein the skid plate front portion defines an interior surface and an aperture extending through the skid plate front portion the interior surface defining a plurality of fixture receiving brackets disposed proximate the aperture and extending rearwardly therefrom, the fixture receiving brackets being configured to receive and engage a fixture in a position adjacent the aperture.

6. The skid plate assembly as recited in claim 5 further comprising a light fixture engaged to the fixture receiving bracket.

7. The skid plate assembly as recited in claim 5 further comprising a sensor assembly engaged to the fixture receiving bracket.

8. The skid plate assembly as recited in claim 5 further comprising a connected vehicle data stream interface module engaged to the fixture receiving bracket.

9. The skid plate assembly as recited in claim 1 further comprising a plurality of fasteners extending through the skid plate cover and the skid plate, for engaging the skid plate cover to the skid plate.

10. The skid plate assembly as recited in claim 9 wherein the skid plate cover is engaged to the skid plate bottom portion and the skid plate front portion.

11. The skid plate assembly as recited in claim 10 wherein the plurality fasteners are arranged such that, upon engagement of the skid plate assembly to the vehicle, the plurality of fasteners are disposed forward of the vehicle bumper, to facilitate access to the fasteners.

12. The skid plate assembly as recited in claim 11 wherein the skid plate cover is manually engageable to and disengageable from the skid plate independent of any disengagement of the skid plate assembly from the vehicle.

13. The skid plate assembly as recited in claim 12 wherein the skid plate cover is manually engageable to and disengageable from the skid plate, independent of any disengagement of the skid plate from the tubular support frame.

14. The skid plate assembly as recited in claim 13 wherein the skid plate cover is formed of polymer material.

* * * * *